United States Patent Office 2,964,522
Patented Dec. 13, 1960

2,964,522
4-AZIRIDINO-1,2-NAPHTHOQUINONES

Walter Gauss and Siegfried Petersen, Leverkusen-Bayer-werk, and Gerhard Domagk, Wuppertal-Elberfeld, Germany, assignors to Farbenfabriken Bayer, A.G., Wuppertal-Elberfeld, Germany No Drawing. Filed Aug. 26, 1958, Ser. No. 757,194

4 Claims. (Cl. 260—239)

This invention relates generally to novel chemical compounds useful in human therapy and more particularly it is concerned with certain novel 4-aziridino-1,2-naphthoquinones that have activity against *Entamoeba histolytica* and thus are useful as amoebicides.

The novel compound according to this invention may be represented by the formula:

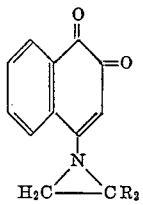

wherein R is either hydrogen or a lower alkyl group, i.e., an alkyl group comprised of at most 4 carbon atoms.

These novel compounds in accordance with this invention can be prepared by reacting a selected $\alpha,\beta$-alkyleneimine with a selected 1,2-naphthoquinone-4-sulphonic acid or a 1,2-naphthoquinone-4-sulphonic acid salt. Suitable $\alpha,\beta$-alkylenimines that may be used in preparing the products of this invention are aziridine, 2-methylethyleneimine and 2,2-dimethylethylimine.

The reaction of the 1,2-naphthoquinone-4-sulphonic acid or 1,2-naphthoquinone-4-sulphonic acid salt with the selected $\alpha,\beta$-alkyleneimine preferably is carried out in a reaction medium comprised of a liquid solvent diluent, which may be either water or a suitable organic liquid, at choice, aqueous media being preferred. It is preferred that the reaction media selected include a suitable buffering agent for maintaining the hydrogen-ion concentration of the reaction mixture near neutrality (pH 7.0) and sodium bicarbonate has been found to be a satisfactory buffering agent for this purpose. The reaction proceeds satisfactorily at ordinary room temperatures, or even at temperatures somewhat lower than ordinary room temperatures, and, if desired, the reaction may be hastened by heating the reaction mixture to temperatures somewhat above ordinary room temperature. The reaction involves simple methathesis with exchange of the alkyleneimine radical for the sulphonic acid or sulphonic acid salt substituent group. The reaction product may be recovered readily from the reaction mixture, in which it is less soluble than the 1,2-naphthoquinone-4-sulphonic acid or sulphonic acid salt, by usual procedures, i.e., filtration of the mixture, followed by purification of the product by recrystallization of the residue from a suitable solvent or reprecipitations of the product from solution.

The products may be recrystallized from organic solvents, such as ethyl acetate or the like, or they may be dissolved in an organic solvent, such as chloroform, followed by dilution of the solution with a miscible polar organic substance, such as methanol, whereupon the product is thrown from the solution in purified state, permitting recovery by filtration.

To facilitate a fuller and more complete understanding of the subject matter of this invention, three specific embodiments thereof will hereinafter be described. These embodiments constitute a preferred subgenus, within the genus hereinabove defined, consisting of 4 - aziridino - 1,2 - naphthoquinone, $\alpha'$ - methyl - 4-aziridino-1,2-naphthoquinone and $\alpha',\alpha'$-dimethyl-4-aziridino-1,2-naphthoquinone. It will be understood that these specific embodiments of the invention are provided by way of illustration merely and that the generic invention is not to be construed as being limited thereto.

Example I

A mixture of about 138 grams (0.5 mole) of potassium 1,2-naphthoquinone-4-sulphonate, 63 grams of sodium bicarbonate, and 2.5 liters of water is stirred at a temperature of approximately 15° C., then 39 cubic centimeters (0.75 mole) of aziridine are added all at once, and the mixture is vigorously stirred at the same temperature for about 5 minutes. The reaction mixture shows hardly any apparent change. The suspension is filtered under suction, and the residue, after being thoroughly washed with water, is then allowed to dry in the air. About 53.7 grams of orange-colored 4-aziridino-1,2-naphthoquinone is obtained having the decomposition point 166–167° C. This is purified by dissolving it in 10 volumes of hot chloroform, then diluting the solution with 2 volumes of methanol. The precipitated crystals are filtered off under suction at 0° C., and washed with methanol. The product so purified consists of well-shaped needles which, when heated, decompose at 173–175° C., after first turning dark.

This compound is active against *Entamoeba histolytica* in a dilution of $10^{-3}$ to $10^{-5}$.

Example II

Approximately 17.1 grams or 21 cubic centimeters (0.3 mole) of 2-methylethyleneimine ($\alpha$-methylaziridine) is added all at once, to a mixture of 55.2 grams (0.2 mole) of potassium 1,2-naphthoquinone-4-sulphonate, 25.2 grams of sodium bicarbonate, and 1 liter water which has been stirred at 15° C. After five minutes the material is subjected to vacuum filtration and the residue, after being washed with a large quantity of water, is dried in the air. A total of 21.3 grams of crude $\alpha$-methyl-4-aziridino-1,2-naphthoquinone is obtained having the decomposition point of 139.5–141.0° C. This orange-colored product can be obtained in a state of almost analytical purity, then having a decomposition point of 143–144° C., by a single recrystallization from 270 cubic centimeters of ethyl acetate.

This compound is active against *Entamoeba histolytica* at a dilution of $10^{-3}$ to $10^{-4.5}$, retaining merely a trace of activity at a dilution of $10^{-5}$.

Example III

The procedure described in Example II is repeated with the exception that 21.3 grams (0.3 mole) of 2,2-dimethylethyleneimine ($\alpha,\alpha$-dimethylaziridine) is used instead of the 2-methylethyleneimine. The reaction product so obtained, $\alpha',\alpha'$-dimethyl-4-aziridino-1,2-naphthoquinone, weighs about 20.6 grams is carmine-red and has a decomposition point of 126.0–126.5° C. It can be substantially completely purified by a twofold recrystallization from ethyl acetate and then its decomposition point is 147–148° C.

This compound is active against *Entamoeba histolytica* at a dilution of $10^{-3}$ to $10^{-3.5}$, showing only slight activity at a dilution of $10^{-4}$ and no activity at a dilution of $10^{-4.5}$.

This application is a continuation in part of copending application, Serial Number 647,475, filed March 21, 1957, now abandoned, by the same inventors and entitled "Novel Chemical Compounds."

Having thus described the subject matter of this invention what is desired to secure by Letters Patent of the United States is:

1. As a new composition of matter a substance selected from the group consisting of compounds represented by the formula:

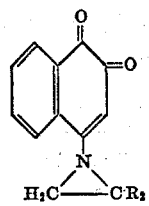

wherein R is chosen from the group consisting of hydrogen and lower alkyl.

2. As a new composition of matter 4-aziridino-1,2-naphthoquinone.

3. As a new composition of matter α'-methyl-4-aziridino-1,2-naphthoquinone.

4. As a new composition of matter α',α'-dimethyl-4-aziridino-1,2-naphthoquinone.

References Cited in the file of this patent

UNITED STATES PATENTS 2,802,001    Marxer _____ Aug. 6, 1957

FOREIGN PATENTS 793,796    Great Britain _____ Apr. 23, 1958

OTHER REFERENCES

Gauss et al.: Angew. Chemie, vol. 67, pp. 217–231 (1955).